W. B. McCARTY.

SELF SERVING STORE.

APPLICATION FILED APR. 7, 1922.

Reissued May 30, 1922. 15,368.

2 SHEETS—SHEET 1.

W. B. McCarty INVENTOR

BY Victor J. Evans ATTORNEY

C. W. Markward

Thomas E. Turpin

WITNESSES

W. B. McCARTY.

SELF SERVING STORE.

APPLICATION FILED APR. 7, 1922.

Reissued May 30, 1922. 15,368.

2 SHEETS—SHEET 2.

W. B. McCarty
INVENTOR

BY Victor J. Evans
ATTORNEY

WITNESSES:
C. W. Markward
Thomas E. Turpin

UNITED STATES PATENT OFFICE.

WILLIAM B. McCARTY, OF JACKSON, MISSISSIPPI.

SELF-SERVING STORE.

15,368. Specification of Reissued Letters Patent. Reissued May 30, 1922.

Original No. 1,348,024, dated July 27, 1920, Serial No. 302,451, filed June 7, 1919. Application for reissue filed April 7, 1922. Serial No. 550,466.

*To all whom it may concern:*

Be it known that I, WILLIAM B. McCARTY, a citizen of the United States, residing at Jackson, in the county of Hinds and State of Mississippi, have invented certain new and useful Improvements in Self-Serving Stores; and I do declare the following to be a full, clear, and exact description of the invention, such as will enable others skilled in the art to which it appertains to make and use the same.

This invention relates to self-serving stores, and more specifically to an improved store, for vending merchandise, in which the customer helps himself or herself independently of aid by a clerk or salesman.

The demand for satisfactory goods at satisfactory prices has given rise to the introduction of stores in which the customer selects the desired goods from the shelves or bins of the store, taking plenty of time to make the selection and consider the cost, without delaying or interfering with the work of the clerks or other attendants of the store, thereby enabling the goods to be sold at prices which are very considerably less than where the goods are shown and handled by clerks or salesmen. However, in stores of this character which are not arranged according to the present invention, the foregoing advantages are accompanied by certain disadvantages which are overcome by the present invention, and some of which will be mentioned for the purpose of comparison, as follows:—

While a large number of customers are selecting merchandise from different parts of a store, a number of such customers are almost inevitably hidden from view of the comparatively few clerks or attendants, and this fact being realized by some of the weaker customers acts as a temptation for them to conceal some of the smaller (though perhaps expensive) articles in their pockets or clothing. Moreover, such a store is a standing invitation for the operations of professional shoplifters. Therefore, the consequent losses are sufficient to curtail the profits to a very considerable extent. To offset such losses, some of the self-serving stores provide a high gallery or vantage point in which one or more detectives or watchmen operate, but obviously the salary of such employee or employees is a very considerable item of expense, and moreover, the presence of such detectives or watchmen is repulsive to the majority of customers of integrity, and tends to exclude this more desirable class of customers from the store.

Another undesirable feature of some self-serving stores is the inability of the customer to obtain the goods wanted without traversing the entire area of the store, even though such customer may desire only a single article which is near the front entrance.

An object of this invention, therefore, is to provide an improved self-serving store which retains most of the desirable features while dispensing with or obviating the undesirable features which were pointed out in the preceding paragraphs, that is, to practically eliminate shoplifting, reduce the payroll to the minimum, invite the more desirable class of customers, and provide for the quick and convenient exit of any customers who do not wish to traverse the entire area of the store, while permitting the customers to traverse the store, who desire to do so.

A further object of the invention is to provide an improved self-serving store in which the cost of shelving is reduced to the minimum, consistent with ample storage space provided by the shelving.

A further object is to provide a store of this character in which a single desk suffices for the operations of accountant, cashier, and bundle wrapper, said desk being arranged between two exits, so that one person may perform the offices of accountant, cashier and bundle wrapper when customers are few, but said desk being sufficiently capacious to permit a number of such employees or attendants to operate thereon.

A further object is to provide a self-serving store in which the attendant's desk and shelving or merchandise holders are so arranged with relation to one another that the attendant or attendants can see the customers in every part of the store, so that the attendant at the desk serves also as a watchman or detective without being considered as such by the customers.

A further object is to provide an improved self-serving store of this character in which entrance gates are provided at the extreme opposite sides of the store, so that a customer who is acquainted with the location of merchandise in the store can enter the gate most convenient to such merchandise as this customer wishes to obtain, thereby avoiding the necessity of crossing the store for the purpose of obtaining such goods.

A further object is to provide an improved merchandise cabinet or holder having its top sufficiently low to permit persons on opposite sides thereof to see one another, and to permit such persons to conveniently inspect the merchandise in bins on the top thereof, this improved cabinet being provided with sample containers having transparent covers, so that samples of the goods to be vended together with a card bearing the price of such goods, can be attractively displayed without danger of being disarranged by thoughtless customers.

Other objects and advantages may become apparent to persons who read the following details of description in connection with the accompanying drawings, in which:—

Figure 1:
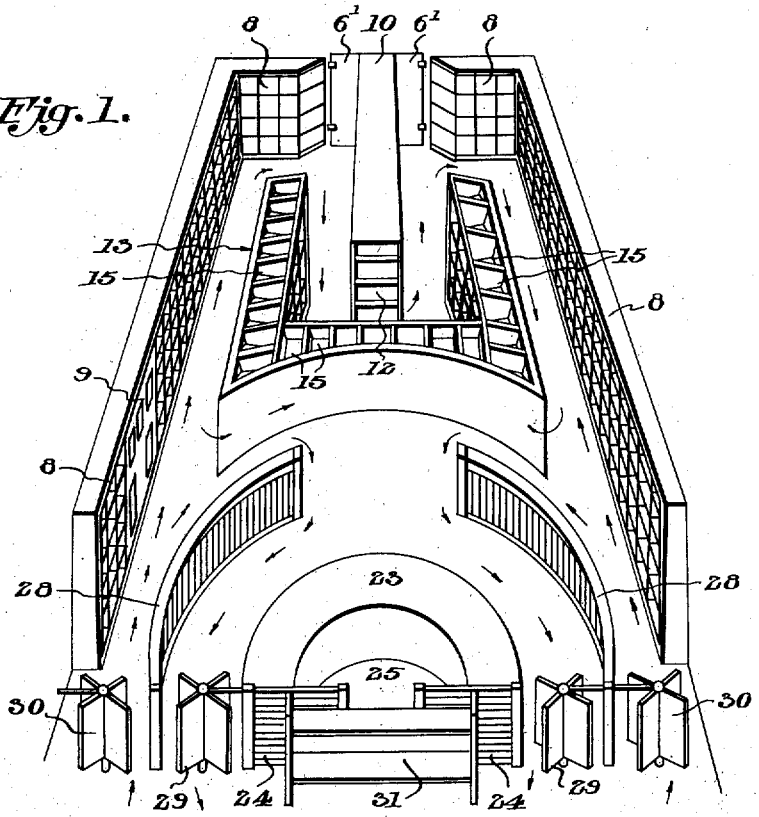
Figure 1 is a somewhat diagrammatic perspective illustrating the general arrangement of merchandise holders, desk, partitions and gates, according to the present invention.
Figure 4:
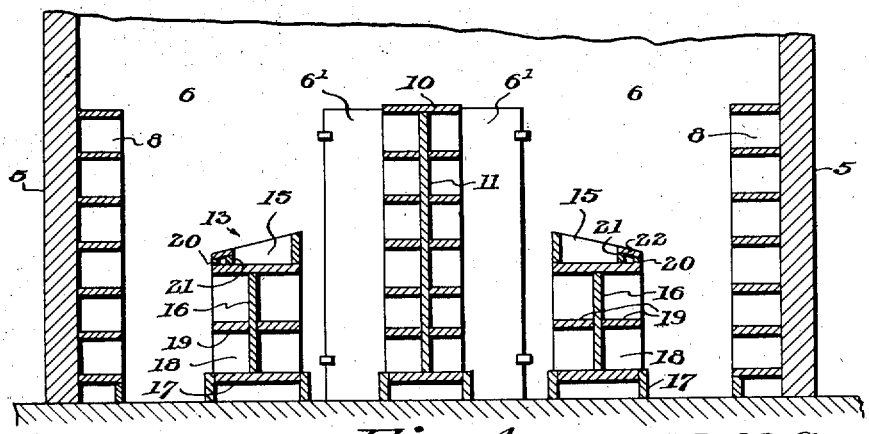
Figure 4 is a transverse vertical sectional view, the section being taken along the line 4—4 of Figure 2.
Figure 2:
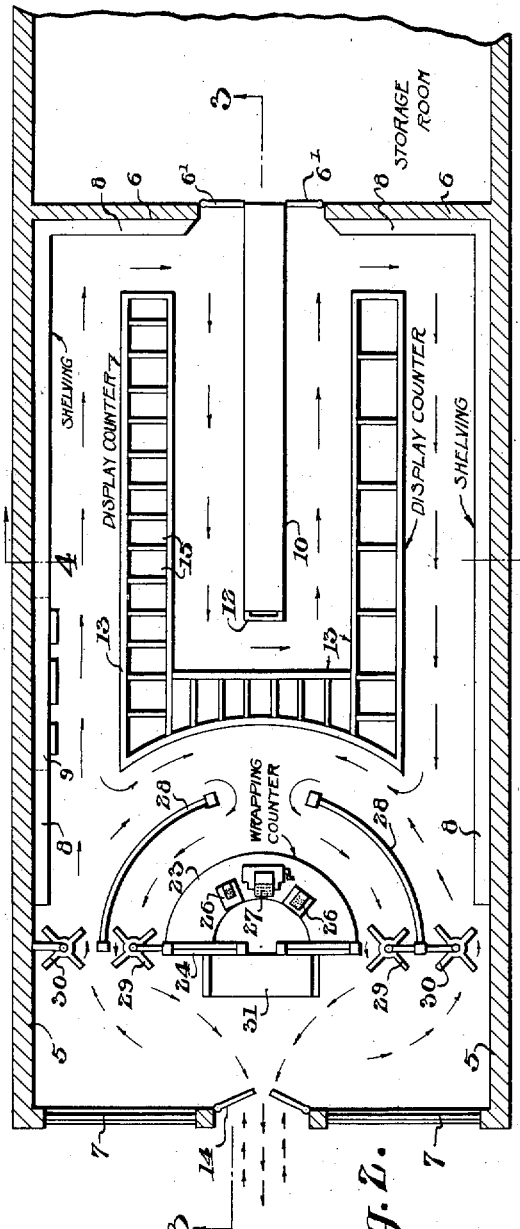
Figure 2 is a view illustrating the storeroom in horizontal section, the section being taken above the shelving or merchandise holders.

Referring to these drawings in detail, in which similar reference characters correspond with similar parts throughout the several views, and in which the side walls 5, rear wall or partition 6 and store-front 7 may be of any ordinary or preferred construction.

The invention consists in the internal arrangement of devices in which the side and rear shelvings 8 may be sufficiently high to necessitate the full upward reach of an ordinary grown person, and the specific construction of this shelving will, of course, depend upon the class of merchandise to be held thereby. In the present instance, however, this shelving is constructed for holding the class of goods generally known as groceries, and a refrigerator is indicated at 9, the details of construction of this refrigerator not constituting a part of this invention, but the same is interposed in one of the side shelvings, and butter, cheese, milk and many other commodities may be kept therein.

Figure 3:
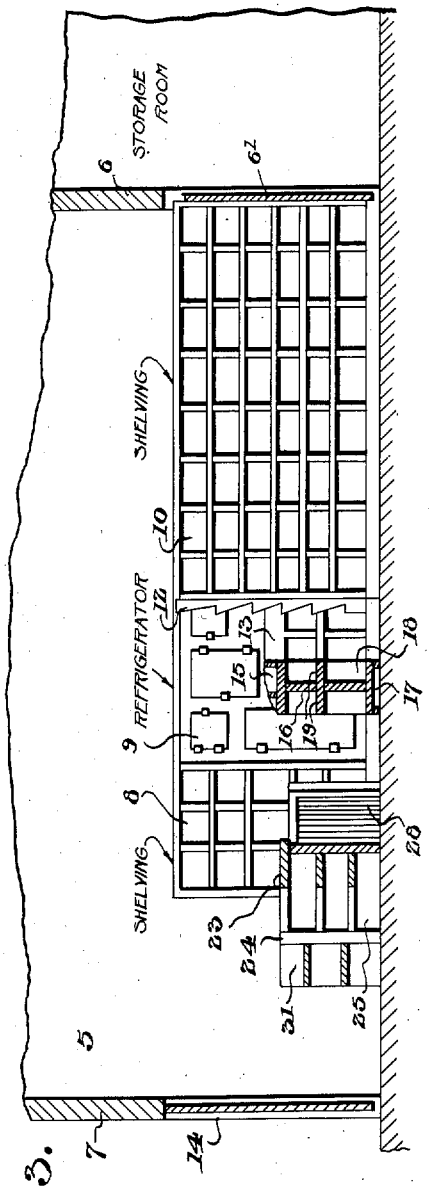
Figure 3 is a vertical sectional view, the section being taken along the line 3—3 of Figure 2.

A central merchandise holder or duplex shelving 10 extends from the partition 6 forwardly approximately to the center of the room, this duplex shelving comprising a partition or wall 11 which is parallel with and substantially halfway between the side walls 5. A magazine rack 12 is disposed on the front end of the shelving 10, and its rear end terminates in and substantially forms a part of the rear wall or partition 6, the latter being provided with doors 6′ through which entrance may be had to a wareroom or general storage room from which the merchandise on the shelvings or merchandise holders may be replenished. As the doors are normally closed, the customers cannot enter the general storage room. A substantially U-shaped display counter or cabinet 13 has its bight portion disposed between the magazine rack 12 and the outer front entrance 14, and the parallel sides of this U-shaped display counter are disposed between the duplex shelving 10 and the side shelvings. This U-shaped cabinet is spaced a sufficient distance from the central and side shelvings to form a passage around and within the U-shaped cabinet, and the distance from the front of the U-shaped cabinet to the magazine rack 12 is so great that the magazines cannot be reached by a person who is outside of the U-shaped part of the passage at the end of the shelving 10. By referring to Figures 1 and 3, it will be seen that the U-shaped cabinet 13 is sufficiently low to permit persons on opposite sides thereof to see one another and to permit such persons to inspect merchandise in the display bins 15. These display bins are supported on and extend laterally across a partition wall 16 which is supported by and extends up from a basal shelf 17. On opposite side of the partition 16 is a plurality of lateral partitions 18 which support shelves 19. The bins 15 are relatively deep, and deeper at their rear ends than at their front ends, so that when filled with merchandise, such as beans, peas, cereals, etc., for instance, the surface presented by such merchandise is inclined toward the customer who is inspecting the same, thereby facilitating a thorough inspection while presenting a pleasing aspect to the customer. A series of sample containers 20 extends along the series of bins, 15, and a partition 21 is common to the bins 15 and sample containers 20. A cover 22 of glass or other transparent material is fitted on the sample containers and price-cards may be placed on or under the cover 20, so that the customer may not only inspect the quality, but also the price of the goods about to be purchased. Approximately midway between the U-shaped counter or cabinet 13 and front entrances 14 is disposed a semi-circular desk 23, and a laterally extending partition or railing 24 adjoins this desk and combines therewith to form a booth 25 in which one or more attendants stand, such as cashier, accountant and bundle wrapper. Adding machines are indicated at 26, and a cash register is indicated at 27, the spaces between the adding machines and partition 24 being reserved for the operation of one or more bundle wrappers.

A pair of curved railings or partitions 28 extend from points at opposite sides of the partition 24 to points between the desk 23 and the display cabinet 13, the rear ends of these railings being spaced a sufficient distance to establish and open communication with the passage around the cabinet 13 and an exit passage between the railings 28 and desk 23. Between the ends of the partition 24 and the front ends of the railings 28 are disposed a pair of exit gates 29, these gates being preferably in the form of a one-way turnstile, any appropriate means (not shown) being provided to prevent the turnstiles from turning backward, and their construction being such that persons cannot enter the exit passages while going from the front toward the rear of the room. Similar, but oppositely rotating gates or turnstiles 30 are provided between the side walls 5 and the front ends of the railings 28, and persons may enter and pass therethrough in going from the front to the rear of the store, but cannot pass therethrough in going toward the front of the store.

In front of the partition 24 a basket holder or shelving 31 is provided, so that when the customer wishes to get a basket in which to carry merchandise from the store such customer may take such basket from the shelf 31, pass through one of the side gates 30, select and take the desired goods from the merchandise holders 8, 10 or 13, and pass toward the front of the store, between the rear ends of the railings 28, and in thus passing outward, the customer is confronted by one or more attendants at the desk 23, whereupon the goods which have been selected by the customer are checked, the respective prices added on the calculating machine 26, the customer receiving a duplicate of the amount produced from the calculating machine, and when the customer has paid for the goods, the amount of the payment is registered on the cash register 27. If any of the goods are to be wrapped, such wrapping is done without the goods being passed to another desk. It will be seen, therefore, that each customer is served with the utmost despatch and with the least inconvenience, and may now pass by a comparatively short course through one of the gates 29 and the front door 14.

Although I have described this embodiment of my invention very specifically, it is not intended to limit this invention to these exact details of construction and arrangement, but changes may be made within the scope of the inventive ideas, as implied and claimed.

What I claim as my invention is:—

1. In a store for the vending of merchandise, a storage inclosure provided with shelving extending along its side walls and rear wall, said inclosure having an attendant's desk in the middle of its front portion, a merchandise holder extending from the middle of the rear portion of the inclosure toward the said attendant's desk, a substantially U-shaped merchandise holder having its bight portion disposed between and spaced from said desk and from the first said merchandise holder a distance to permit persons to pass one another through the spaces thus provided, the other parts of said U-shaped merchandise holder being spaced from the said wall shelving and from the first said merchandise holder a distance to permit persons to pass therebetween, all parts of said U-shaped merchandise holder being sufficiently low to permit an attendant at said desk to see persons on all sides of said U-shaped merchandise holder, rearwardly bowed partitions extending forward and laterally from points midway between said merchandise holder and attendant's desk to points midway between said side walls and said attendant's desk to form walled entrance passages and exit passages which are in open communication with said passageway through a doorway between said partitions, exclusively entrance gates in said entrance passages, and exclusively exit gates in said exit passages the latter being between said rearwardly bowed partitions and the said attendant's desk.

2. In a store for the vending of merchandise, a storage inclosure provided with merchandise holders extending along its side walls, said inclosure having an attendant's desk in the middle of its front portion, a merchandise holder extending from the middle of the rear portion of the inclosure toward the said attendant's desk, a substantially U-shaped merchandise holder having its bight portion disposed between and spaced from said desk and from the said merchandise holders a distance to permit persons to pass therebetween, all parts of said U-shaped merchandise holder being sufficiently low to permit an attendant at said desk to see persons on all sides of said U-shaped merchandise holder, partitions extending from points between said U-shaped merchandise holder and attendant's desk to points between said side walls and said attendant's desk to form walled entrance passages and exit passages, exclusively entrance gates in said entrance passages, and exclusively exit gates in said exit passages, the latter being between said partitions and the said attendant's desk.

3. In a store for the vending of merchandise, a storage inclosure provided with merchandise holders extending along its side walls, said inclosure having an attendant's desk in the middle of its front portion, a merchandise holder extending from the middle of the rear portion of the inclosure toward the said attendant's desk, a substantially U-shaped merchandise holder having its bight portion disposed between and spaced from said desk and from the said merchandise holders a distance to permit persons to pass therebetween, all parts of said U-shaped merchandise holder being sufficiently low to permit an attendant at said desk to see persons on all sides of said U-shaped merchandise holder, partitions extending from points between said U-shaped merchandise holder and attendant's desk to points between said side walls and said attendant's desk to form walled entrance passages and exit passages, exclusively entrance gates in said entrance passages and exclusively exit gates in said exit passages.

4. In a store for the vending of merchandise, a storage inclosure provided with merchandise holders extending along its side walls, said inclosure having an attendant's desk in the middle of its front portion, a merchandise holder extending from the middle of the rear portion of the inclosure toward the said attendant's desk, a substantially U-shaped merchandise holder having its bight portion disposed between and spaced from said desk and from the said merchandise holders a distance to permit persons to pass one another through the spaces thus provided, the other parts of said U-shaped merchandise holder being spaced from the first named merchandise holders and from the second named merchandise holder a distance to permit persons to pass therebetween, all parts of said U-shaped merchandise holder being sufficiently low to permit an attendant at said desk to see persons on all sides of said U-shaped merchandise holder, partitions extending from points between said merchandise holder and attendant's desk toward the side walls and toward the forward portion of the store to points between said side walls and said attendant's desk to form walled entrance passages and exit passages, exclusively entrance gates in said entrance passages, and exclusively exit gates in said exit passages, the latter being between said partitions and the said attendant's desk.

5. In a store for the vending of merchandise, a storage inclosure with side walls, said enclosure having an attendant's desk in the middle of its front portion, a merchandise holder extending from the middle of the rear portion of the inclosure toward the said attendant's desk, a substantially U-shaped merchandise holder having its bight portion disposed between and spaced from said desk and from the said merchandise holder a distance to permit persons to pass therebetween, said U-shaped merchandise holder being sufficiently low to permit an attendant at said desk to see persons on all sides of said U-shaped merchandise holder, partitions extending from points between said U-shaped merchandise holder and attendant's desk to points between the side walls of the inclosure and said attendant's desk to form walled entrance passages and exit passages, exclusively entrance gates in said entrance passages, and exclusively exit gates in said exit passages.

6. In a store for the vending of merchandise, a storage inclosure with side walls, said inclosure having an attendant's desk in its front portion, merchandise holders extending from the rear portion of the inclosure toward the said attendant's desk and to points adjacent to said desk, said holders spaced apart a distance to permit persons to pass each other therebetween, and the passages between the holders being open at their forward ends, partition means between the merchandise holders and the attendant's desk to form walled entrance passages and exit passages, the space between the partition means and the merchandise holders being sufficiently wide to permit persons to pass each other, exclusively entrance gates in said entrance passages and exclusively exit gates in said exit passages, whereby a person passing either entrance gate may pass directly to either of the forward ends of the passages between the merchandise holders.

7. In a store for the vending of merchandise, a storage inclosure, said inclosure having an attendant's desk in its front portion, merchandise holding means occupying the rear portion of the inclosure and associated with passages open at points adjacent to the said desk, partition means between the merchandise holding means and the attendant's desk to form a walled entrance passage and a walled exit passage, an exclusively entrance gate in said entrance passage, and an exclusively exit gate in said exit passage, said partition means arranged whereby a person passing the entrance gate may pass directly to and from either of the forward ends of the passages associated with the merchandise holding means.

In testimony whereof I have hereunto set my hand.

WILLIAM B. McCARTY.